United States Patent [19]

Häfner et al.

[11] 4,112,752
[45] Sep. 12, 1978

[54] APPARATUS FOR MEASURING SEVERAL FORCE COMPONENTS

[75] Inventors: Hans Wilhelm Häfner; Frieder Pfister, both of Augsburg, Germany

[73] Assignee: Pfister Waagen GmbH, Germany

[21] Appl. No.: 795,707

[22] Filed: May 11, 1977

[30] Foreign Application Priority Data

Jun. 2, 1976 [DE] Fed. Rep. of Germany ....... 2624647

[51] Int. Cl.² ............................................. G01M 9/00
[52] U.S. Cl. .................................................... 73/147
[58] Field of Search .............................. 73/147, 133 R

[56] References Cited

FOREIGN PATENT DOCUMENTS 1,293,164  4/1962  France ...................................... 73/147

*Primary Examiner*—Donald O. Woodiel
*Attorney, Agent, or Firm*—Hill, Gross, Simpson, Van Santen, Steadman, Chiara & Simpson

[57] ABSTRACT

An apparatus is disclosed for measuring force components exerted by a flowing medium such as air in a wind tunnel upon an object to be measured. The object is rigidly attached to an object carrier movable in a first direction in a first bearing guide member. A first measuring force device connects between the object carrier and the first bearing guide member to restrain movement of the object carrier in the first direction. A second bearing guide member in the first bearing guide member is movable in a plane perpendicular to the first direction with second and third measuring force devices being connected between the first and second bearing guide members to restrain movement of the object carrier in the plane. A third bearing guide member may also be provided on which the second bearing guide member is movable to permit a pivoting movement of the second bearing guide member. All of the bearing guide members are preferably constructed as hydrostatic bearings.

11 Claims, 3 Drawing Figures

APPARATUS FOR MEASURING SEVERAL FORCE COMPONENTS

BACKGROUND OF THE INVENTION

1. Field of the Invention

The invention relates to an apparatus for the measuring of several force components, preferably of the forces of a flowing medium acting on an object to be measured.

2. Description of the Prior Art

Measuring apparatus of the above type are utilized preferably for aerodynamic measurements, for example on flying bodies, vehicle-carriages, turbine-blades and other flow-bodies. Similar apparatus are also required if it is a question of carrying out hydrodynamic measurements, for example on ship models or other bodies in flowing liquid.

Previously the separation of the forces occurring into force vectors, such as into driving forces, side forces or resistance moments about the longitudinal, transverse- and vertical-axes, took place through steering rods, levers, taut wires, etc. through which, for the different directions of force, individual force-measuring devices were connected to the body to be measured in separate arrangements.

In this connection, however, difficulties arose because mutual influences of the different force-measuring devices could not be excluded. Of particular disadvantage is the positioning of steering rods, levers, or taut wires through a flow-chamber such as a wind-tunnel since there results both measuring-value distortions as well as oscillations which impair the measurements to an extraordinary extent.

Finally, a further great disadvantage is that the time and labor required for assembly and disassembly when changing the object to be measured is disproportionately great and also requires expert knowledge and experienced personnel.

SUMMARY OF THE INVENTION

An object of the invention is to solve the above mentioned disadvantages and to present a solution for the indicated problem. It is another object of the invention to provide an object carrier for a wind or fluid chamber which is simple to manipulate and which is to a large extent free from measuring inaccuracies and disturbing influences and is also economical.

According to the invention, an object carrier is provided to which the measuring object is rigidly connected and which provides the force components to be measured. This object carrier is arranged on a bearing system permitting movement in direction of the force components and is held in each of these directions by a force measuring device.

In this connection, the arrangement of the object carrier on the bearing system may be selected so that the latter permits simultaneous movement of the object carrier in several directions.

An advantageous embodiment of the apparatus consists in an arrangement of the object carrier in the bearing system which permits movement of the object carrier in the direction of three axes perpendicular to one another in a spatial coordinating system.

In the development of the apparatus according to the invention, the object carrier with the bearing system is arranged with bearings permitting a rotating motion about a center point whereby the bearing system is held in two planes by force measuring devices aligned towards a center point of the measuring object.

Likewise in a suitable embodiment of the apparatus according to the invention, the bearing or support system and a swingable bearing or support are equipped with hydrostatic bearings. Such bearings have the advantage that they are practically frictionless, are free from play, and additionally provide a high damping between the guided sliding elements of the support.

A particularly simple and suitable construction of the apparatus is attained such that the object carrier is positioned in a first guide arrangement permitting vertical movement, and that this first guide arrangement is positioned in a second guide arrangement permitting second, horizontal movements; that the object carrier is connected in a vertical direction through a force measuring device with the first guide arrangement, and that the first guide arrangement in the horizontal plane is connected in two different directions through force measuring devices with the second guide arrangement arranged to be stationary.

Further advantages result with the invention when the second guide arrangement is positioned in a third guide arrangement permitting a pivoting or rocking on all sides about a center point of the object and that the second guide arrangement is connected through force measuring devices with the third guide-arrangement (arranged to be stationary) in two planes passing through the rotating center point.

With this apparatus the force measuring devices may be embodied as electromechanical measuring value indicators which measure pressure or traction, for example, such as wire strain gauge force pickups or piezoelectric force pickups.

The object to be measured is connected in tension or force locking manner to the object carrier and into which the object introduces the force components to be measured. The object carrier separates the vector forces without the need for steering rods, levers, wires, etc. through the arrangement. By providing the object carrier without the above elements in hydrostatic bearings in directions of corresponding functional planes, an extraordinarily uncomplicated construction results in the invention for the separation and measurement of several force components.

In the invention there results an additional advantage in that optimal rigidity of construction with best dynamic behavior and high accuracy is achieved. Without difficulty, desired measuring functions such as the rotation of the entire measuring device during measurement in the flow chamber about an axis may be combined with the spherical shifting on all sides about an exactly definable center point and allowing measurements of different moments about the axes. Also a spatial shifting of the entire measuring apparatus with the object fixed thereon in the flow cross-section is possible. This is a substantial advantage of the invention. Furthermore, the assembly and disassembly of the object to be measured is simple, uncomplicated, time-saving and requires no special training or special knowledge on the part of attending personnel.

DESCRIPTION OF THE PREFERRED EMBODIMENTS

Figure 1:
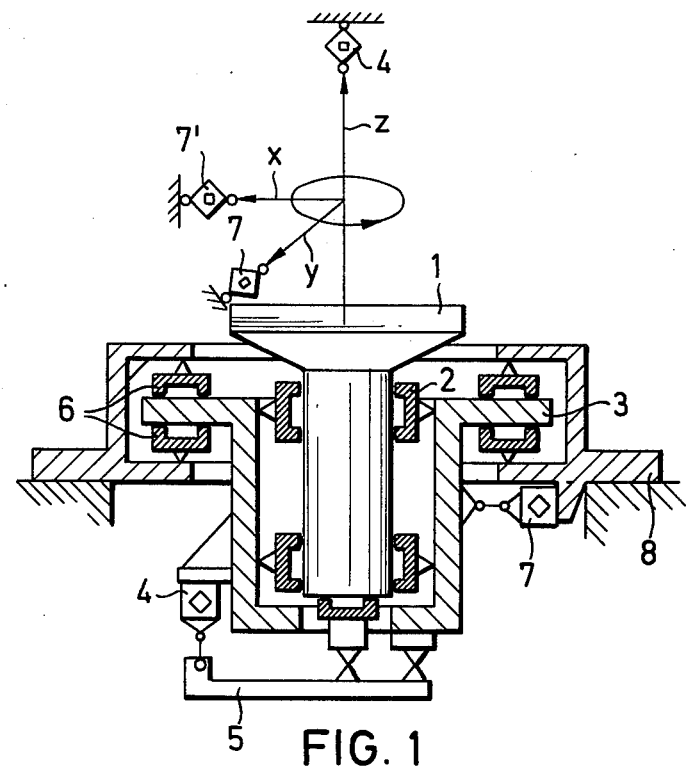
FIG. 1 shows with one portion in prospective and another in section an apparatus for the measuring of several force components.

In FIG. 1 is slidably positioned the object carrier 1 by means of hydrostatic bearings 2 in a first guide arrangement 3 in such manner that the carrier may move in the vertical direction z. The object carrier 1, however, is held in the vertical direction z by strain gauge force pickup 4 and a lever system 5 arranged as a force transfer member.

The first guide arrangement 3 is slidably positioned by means of hydrostatic bearings 6 in a second guide arrangement 8 such that it may carry out a movement in the horizontal plane in a desired direction. It is, however, connected with the second guide arrangement 8 with the aid of strain gauge force pickups 7, 7' (only 7 being recognizable in the plane of the Figure) in the horizontal plane in different directions, for example, as indicated by means of the vectors x and y in the upper part of the Figure. The second guide arrangement 8 is arranged to be stationary.

Figure 2:
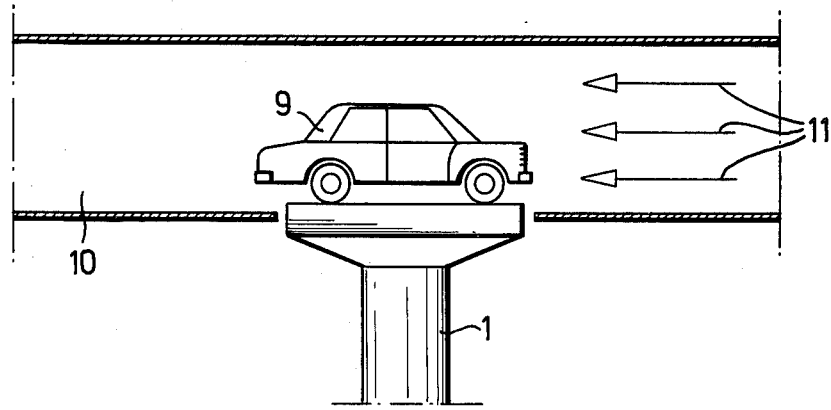
FIG. 2 shows with one portion in prospective and another in section the object carrier with a measuring object in the wind-channel.

FIG. 2 shows the object carrier 1 with a constructed measuring object 9 in a wind tunnel 10. The measuring object 9 is, in the example shown, the model of the carriage or body of a powered vehicle. The flow in the wind tunnel 10 is indicated by the arrows 11.

Figure 3:
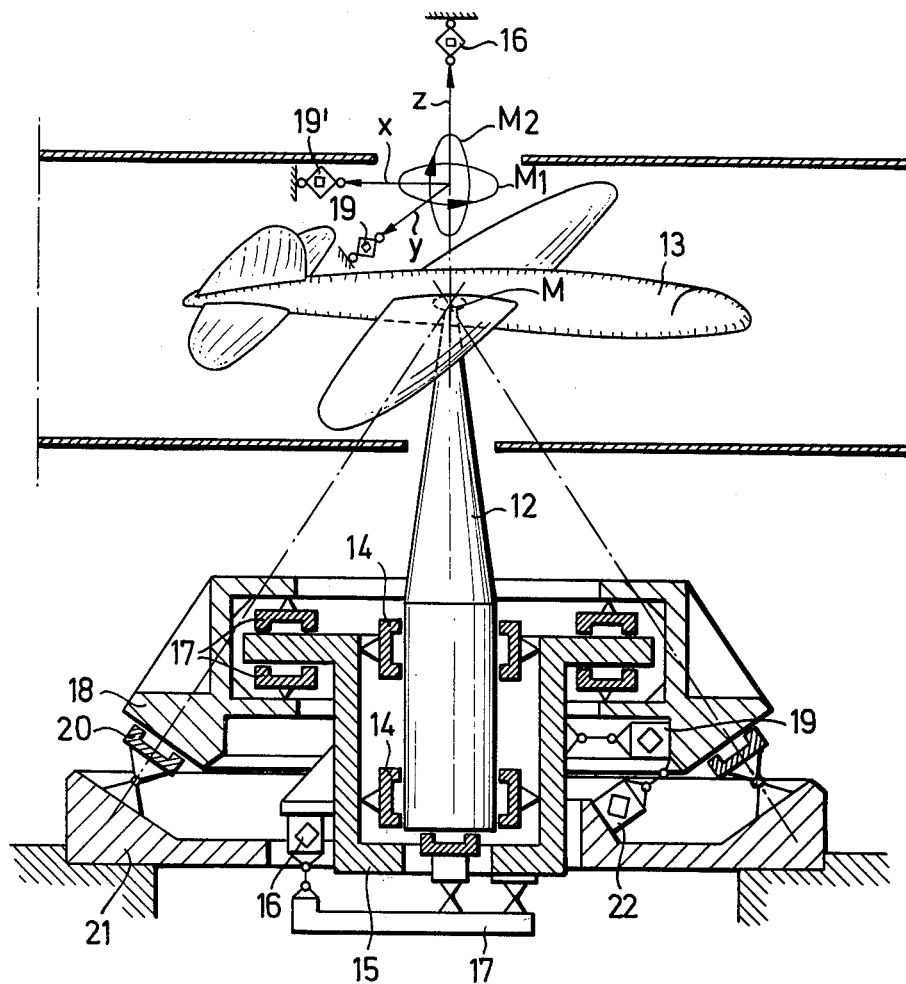
FIG. 3 shows likewise in prospective and section another apparatus for the measuring of several force components as well as moments.

In FIG. 3, the object carrier is to be found with a flow model 13 in form of an airplane model arranged in force-locking manner thereon. The object carrier, as in the apparatus according to FIG. 1, is slidably positioned on hydrostatic bearings 14 in a first guide arrangement 15 such that it may carry out a purely vertical movement z. This is accomplished with the aid of the strain gauge force pickup 16 connected through a set of levers 17 with the first guide arrangement. The first guide arrangement 15 is slidably positioned with hydrostatic bearings 17 in a second guide arrangement 18 such that it may carry out a movement in a horizontal plane in a desired direction. It is, however, connected through strain gauge force pickups 19, 19' (of which only 19 can be seen in the Figure) with the second guide arrangement in the two directions x, y. This second guide arrangement is positioned with hydrostatic bearings 20 in a third guide arrangement 21 such that it may carry out a swinging or pivoting movement about the center point M which in the example is shown in the axis of the object carrier 12, said swinging or pivoting movement being capable of being carried out spherically in all directions. However, the second guide arrangement is restrained in free movement because the strain gauge force pickups 22, 22' (only 22 can be seen in FIG. 3, however) which are connected with the third guide arrangement 21 in two planes approximately perpendicular to one another and whose intersecting lines in the embodiment are shown passing by way of example through the center point M. This third guide arrangement 21 is arranged to be stationary.

With the measuring arrangement according to FIG. 3, one may measure the power vectors x, y and z, (every force directed as desired in the chamber) and additionally the moment $M_1$ about a vertical axis as well as the moment $M_2$ about a horizontal axis may be measured.

In this connection the construction of the measuring device, as is recognized, is uncomplicated, is capable of inspection, and suitable for the purposes discussed above.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. An apparatus for measuring several force components exerted by a flowing medium on a measuring object, comprising an object carrier to which the measuring object is fixedly connected and which provides the force components to be measured, said object carrier being arranged in a bearing system means for allowing movement in the directions of the force components, said bearing system means including a first guide arrangement positioned for movement in a second guide arrangement, said object carrier being restrained in the directions of the force components by force measuring devices, the bearing system means being arranged on an additional bearing system means for permitting a pivoting movement of the object carrier in all directions about the measuring object center point, the bearing system means on the additional bearing system means being restrained by force measuring devices, and the additional bearing system means and the bearing system means each having hydrostatic bearings.

2. An apparatus according to claim 1, characterized in that the object carrier is arranged in the bearing system means such that simultaneous movement of the object carrier in several directions can occur.

3. Apparatus according to claim 1, characterized in that the object carrier is arranged in the bearing system means to permit a movement of the object carrier in the direction of three mutually orthogonal axes of a spatial coordinating system.

4. An apparatus for measuring several force components exerted by a flowing medium on a measuring object, comprising an object carrier to which the measuring object is fixedly connected and which provides the force components to be measured, said object carrier being arranged in a bearing system means for allowing movement in the directions of the force components, said object carrier being restrained in the directions of the force components by force measuring devices, the bearing system means comprising a first guide arrangement allowing vertical movements and this first guide arrangement being positioned in a second guide arrangement permitting horizontal movements, the object carrier being connected in a vertical direction through a force measuring device with the first guide arrangement, and the first guide arrangement being connected in a horizontal plane in two different directions through force measuring devices with the second guide arrangement, said second guide arrangement being stationary.

5. An apparatus according to claim 6, characterized in that the second guide arrangement is positioned in a third guide arrangement permitting pivoting of the measuring object to all sides about a center point thereof, and that the second guide arrangement connects with force measuring devices to the third guide arrangement which is arranged to be stationary, said force measuring devices being aligned towards the center point of the measuring object.

6. An apparatus according to claim 1, characterized in that the force measuring devices comprise strain gauge force pickups.

7. An apparatus according to claim 1 in which the force measuring devices comprise piezoelectric force pickups.

8. An apparatus for measuring force components exerted by a flowing medium on an object to be measured comprising:
   (a) an object carrier to which the object is rigidly attached;
   (b) a first bearing guide means within which said object carrier is movable in a first direction, a first measuring force device being connected between the object carrier and first bearing guide means to restrain movement of the object carrier in the first direction; and
   (c) a second bearing guide means within which said first bearing guide means is movable in a plane perpendicular to said first direction, second and third measuring force devices being connected between the first and second bearing guide means to restrain movement of the object carrier in the plane.

9. The apparatus of claim 8 in which a third bearing guide means is provided on which said second bearing guide means is movable to permit a pivoting movement of the second bearing guide means, a fourth measuring force device connected between the second and third bearing guide means restraining said pivoting movement.

10. A method for measuring force components exerted by a flowing medium on an object to be measured, comprising the steps of:
    providing an object carrier on a first bearing guide means movable in a first direction and providing the first bearing guide means on a second bearing guide means movable in a plane perpendicular to said first direction;
    rigidly attaching an object to be measured to an object carrier;
    measuring a force between the object carrier and the first bearing guide means in said direction of movement; and
    measuring forces between the first bearing guide means and the second bearing guide means in two different directions in said plane.

11. The method of claim 10 including the further step of providing a third bearing guide means on which said second guide means is movable to permit a pivoting movement of the second bearing guide means and measuring a force between the second and third bearing guide means in said direction of pivoting movement.

* * * * *